W. C. J. GUILFORD.
FOOT MASSAGING MACHINE.
APPLICATION FILED DEC. 23, 1914.

1,253,229.

Patented Jan. 15, 1918.
6 SHEETS—SHEET 4.

Witnesses:
Jas E Hutchinson
G. Wedemeier

Inventor:
Wm. C. J. Guilford,
By Bacon Milans, Attorneys

W. C. J. GUILFORD.
FOOT MASSAGING MACHINE.
APPLICATION FILED DEC. 23, 1914.

1,253,229.

Patented Jan. 15, 1918.
6 SHEETS—SHEET 5.

Witnesses:
Jas. E. Hutchinson
G. Nedemeier

Inventor:
By Wm. C. J. Guilford,
Aaron Milans, Attorneys

W. C. J. GUILFORD.
FOOT MASSAGING MACHINE.
APPLICATION FILED DEC. 23, 1914.
1,253,229.
Patented Jan. 15, 1918.
6 SHEETS—SHEET 6.
Fig. 8.
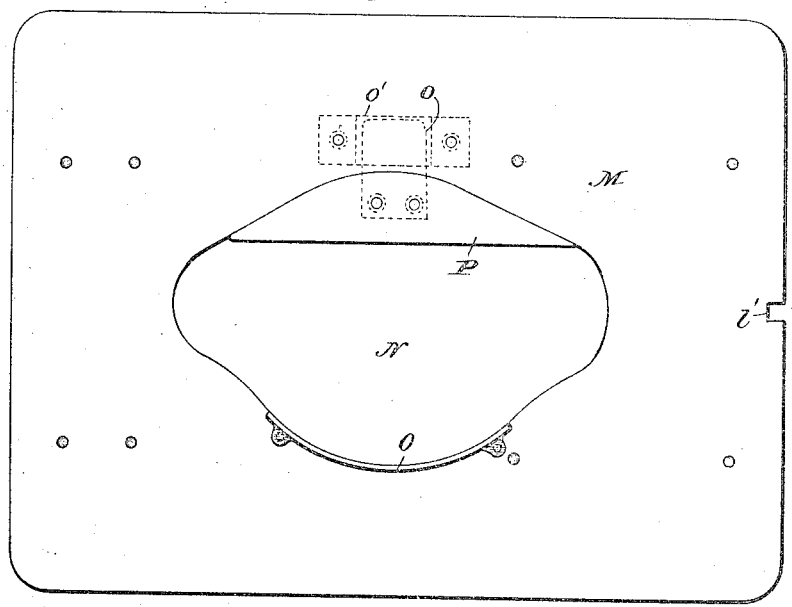
Fig. 8ᵃ.
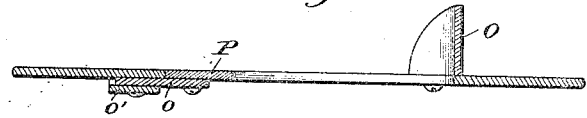
Fig. 9.
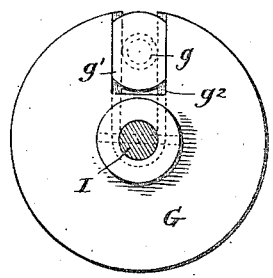
Fig. 10.
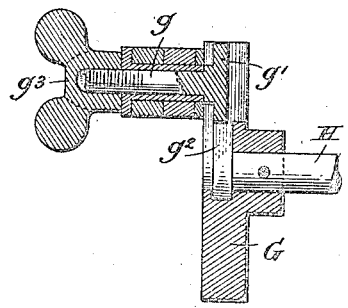
Witnesses:
Jas. E. Hutchinson
G. Wedemier
Inventor:
Wm. C. J. Guilford,
By Bacon & Milans, Attorneys

UNITED STATES PATENT OFFICE.

WILLIAM C. J. GUILFORD, OF HARRISON, MAINE.

FOOT-MASSAGING MACHINE.

1,253,229.  Specification of Letters Patent.  Patented Jan. 15, 1918.

Application filed December 23, 1914. Serial No. 878,728.

*To all whom it may concern:*

Be it known that I, WILLIAM C. J. GUILFORD, citizen of the United States, residing at Harrison, in the county of Cumberland and State of Maine, have invented certain new and useful Improvements in Foot-Massaging Machines, of which the following is a specification, reference being had therein to the accompanying drawing.

This invention relates to the massaging art, and has for its object the provision of a machine especially designed for the treatment of feet.

It is a well recognized fact that many ailments of different portions of the human body, though in some instances supposed to be remotely associated with the feet, are directly traceable, for their cause, to the feet, frequently involving broken or misplaced arches and associated muscular and nerve affections.

I have found that by subjecting the feet to a massaging process, considerable relief is imparted to the patient and actual curative results accomplished, and it has been with an aim to facilitate an effective and expeditious manipulation of the foot or mechanical massaging of the same, that gave rise to the present conception.

Broadly the invention embraces an apparatus having a soft, flexible massaging instrumentality, in combination with means for imparting rapid and uniform pulsations or movements thereof to correspondingly effect the part or parts being treated, the more common result of the operation being the loosening up and lifting of the bony structure of fallen or misplaced arches, the softening and relieving of muscular tension, with the reduction or entire obliteration of nerve affections, all universally found to result in great pain and discomfort to the patient.

Preferably the invention comprehends pneumatic means as the improved massaging medium, conveniently associated with improved devices for maintaining the feet in operative relation thereto, while in the course of treatment.

In the various combinations and associations of parts and devices of the practical machine constituting an embodiment of the present invention, many improved devices are presented, and these with the general features hereinabove described will be more readily understood and appreciated from the specific description hereinafter contained wherein the preferred embodiment of the invention is disclosed in connection with the drawings accompanying and forming a part of such description.

In the said drawings:

Fig. 8 is a transverse sectional view through one of the plates constituting the foot rest, showing the removable fillers for reducing the opening in said plate, Fig. 8$^a$ is a transverse section of Fig. 8, and Figs. 9 and 10 are detail views of the adjustable operating connection between oppositely projecting piston rods working in air cylinders, as will hereinafter appear.

Figure 1:
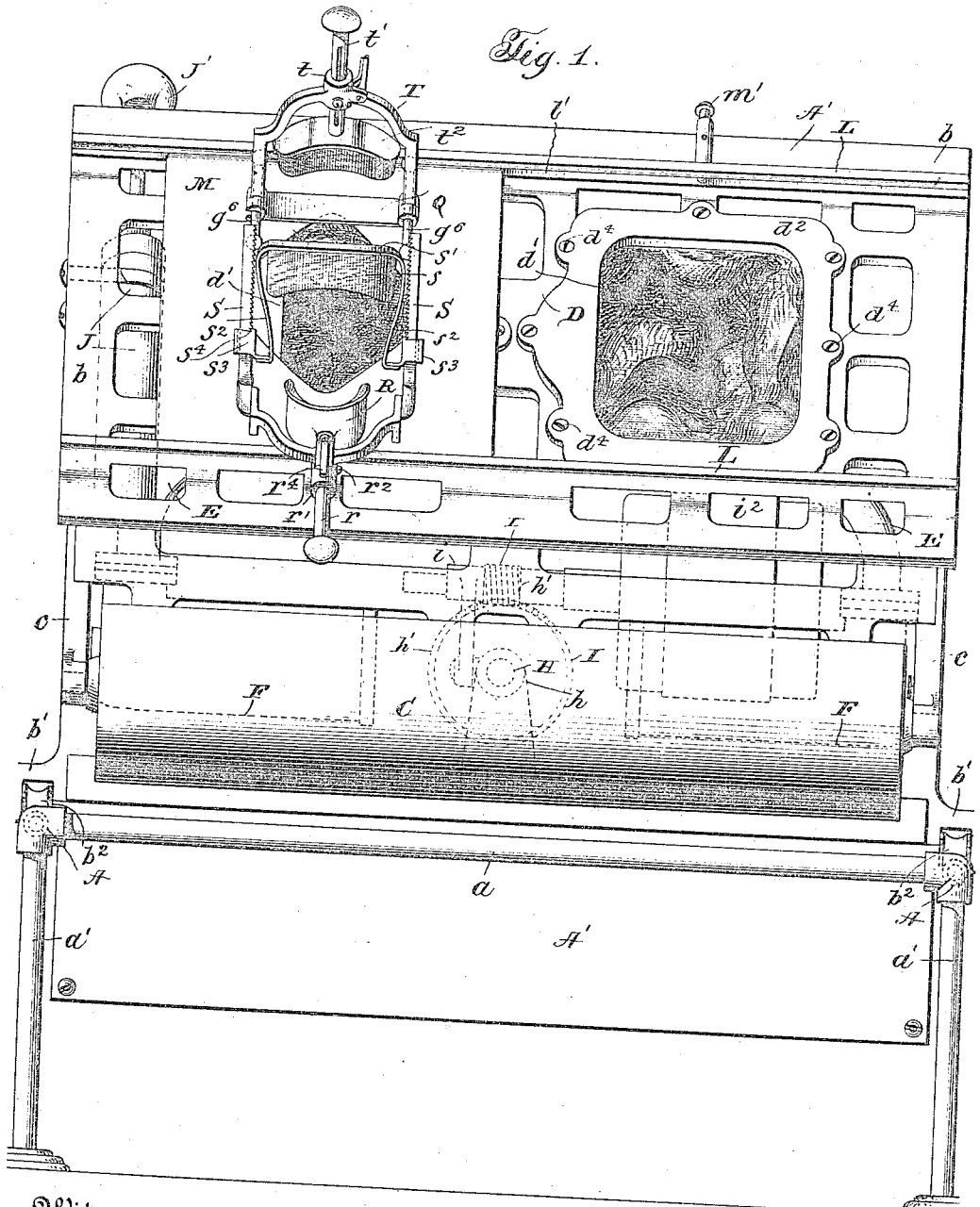
Figure 1 is an elevation of the machine looking at the same in its complete state from the front.

Referring more specifically to the drawings, wherein like reference letters refer to corresponding parts in the several views, A represents a pair of tracks disposed a suitable distance apart and in parallel relation, the same constituting the side bars of a rectangular frame,—the end bars of the latter being indicated at $a$,—having at the corners thereof depending standards or supporting feet $a'$ adapted to rest upon the floor and maintain the frame at a proper elevation from the floor so that the machine proper, now to be described may be supported upon the tracks in a manner to be moved longitudinally of the side bars to bring the machine into proper relation to a chair or stool mounted in front thereof and upon which it is intended the patient shall be seated.

A′ represents a strong but light metallic frame in the nature of a casing, having bottom, front, rear, end and top walls, as much as it is possible of the metal of which is cut away, for the sake of lightness, while preserving adequate strength, the said frame or casing being of oblong shape, having the top wall thereof inclined to face forwardly, as at $b$. The end walls carry brackets $b'$ (a pair at each end of the machine), bearing anti-friction rollers $b^2$ of grooved peripheral type to bear upon the rails A and to ride thereover, the weight of the machine and the grooved nature of the rollers being sufficient to retain the machine in its various positions of adjustment.

The front wall of the frame has projecting therefrom, at the opposite ends of the machine, a pair of horizontally disposed brackets $c$, one perforated as at $c'$ and the other provided with an upwardly opening notch $c^2$ to detachably receive and support therefrom, stub shafts or projections $c^3$ at the opposite ends of a tank C, adapted to contain compressed air for a purpose to be later pointed out.

In the inclined top wall of the casing I provide juxtaposed solid portions D, each formed with a central opening $d$ for the passage of air, and above these solid portions I place a flexible, expansible soft massaging medium $d'$, preferably rubber, to confine manipulating air therewithin, the rubber being in sheet formation and of substantial fullness to permit expansion and contraction thereof within wide limits, without danger of bursting or tearing the same, and this sheet being secured and hermetically sealed around its edges by means of an overlying frame $d^2$, confining the marginal portions of the rubber sheet between the same and the sealed portions to which I have alluded, suitable screws $d^4$ passing through the last mentioned frame and into the top of the main frame or casing to fasten the parts together.

Fastened to and leading from the back of the top member of the frame or casing, so as to feed to the apertures beneath the rubber sheet are a pair of pipes E leading from the compression ends of a pair of alined cylinders F mounted within the casing A and upon the bottom thereof in a rigid and fixed position, both relative to the casing and to each other, the adjacent inner ends of these cylinders being open to permit free play of a pair of piston rods $f$, pivotally connected, as at $f'$ to the pistons $f^2$ adapted to reciprocate in the cylinders F. The inner ends of the piston rods are superposed and have a common pivotal fastening $g$ passing therethrough to unite them together to a crank disk G, the fastening having a headed portion $g'$ inserted through the open end of a dovetail groove $g^2$ in the rear face of the crank disk and a thumb nut $g^3$ securing the parts just described together in the proper adjusted relation to the crank disk to secure the desired throw of the piston rods and pistons carried thereby. The crank disk has concentric to its axis a shaft H, supported in bearings $h$ within and on the base of the casing, said shaft at its forward end carrying a worm gear $h'$ meshing and adapted to receive motion from a worm I supported at its outer end in a bearing $i$ arched over and fastened to the bearings, and at its inner end being connected to be driven by a motor $i^2$, preferably of an electric type, adapted to be suitably coupled up with any convenient source of electrical energy.

Figure 2:
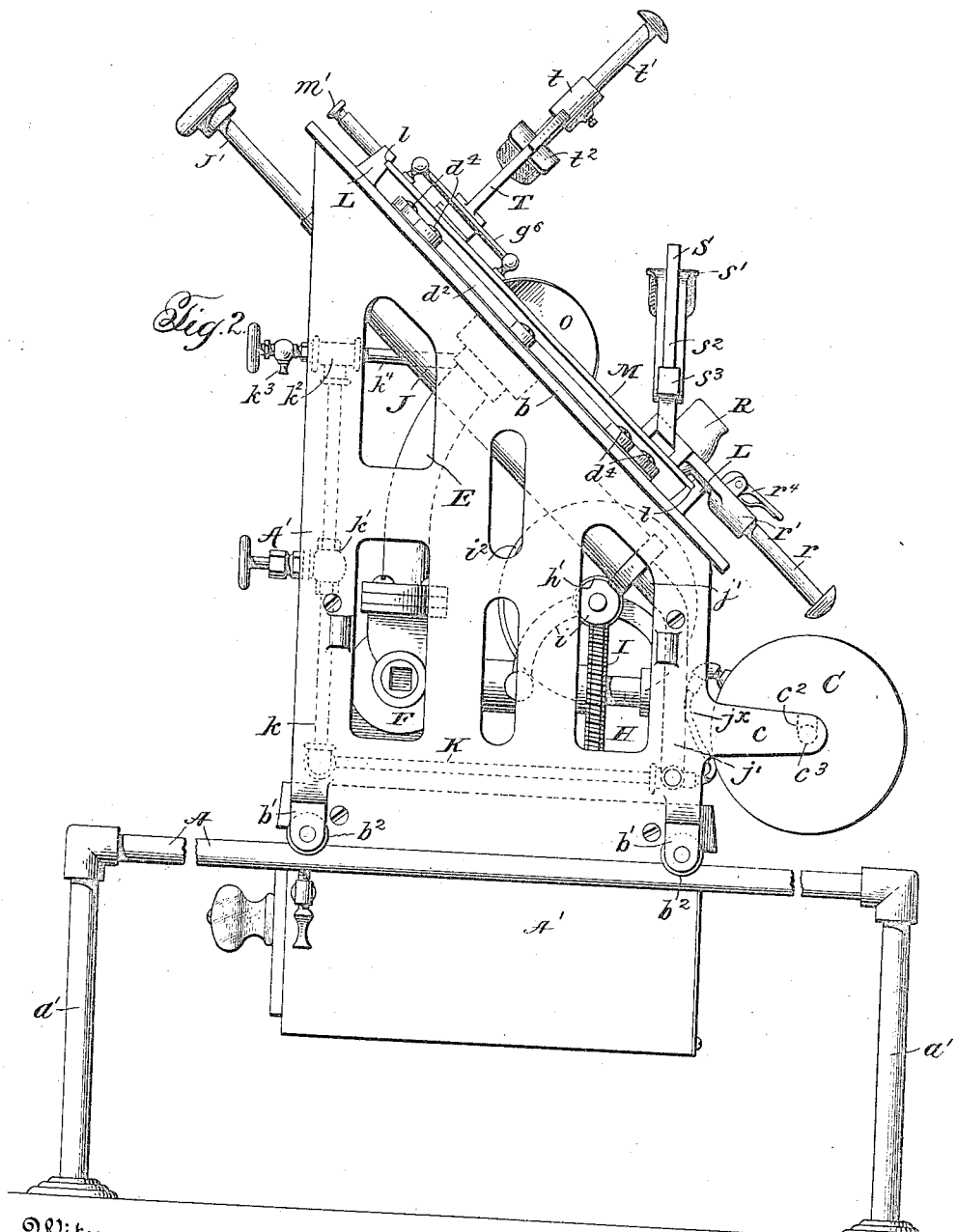
Fig. 2 is an end elevation.
Figure 3:
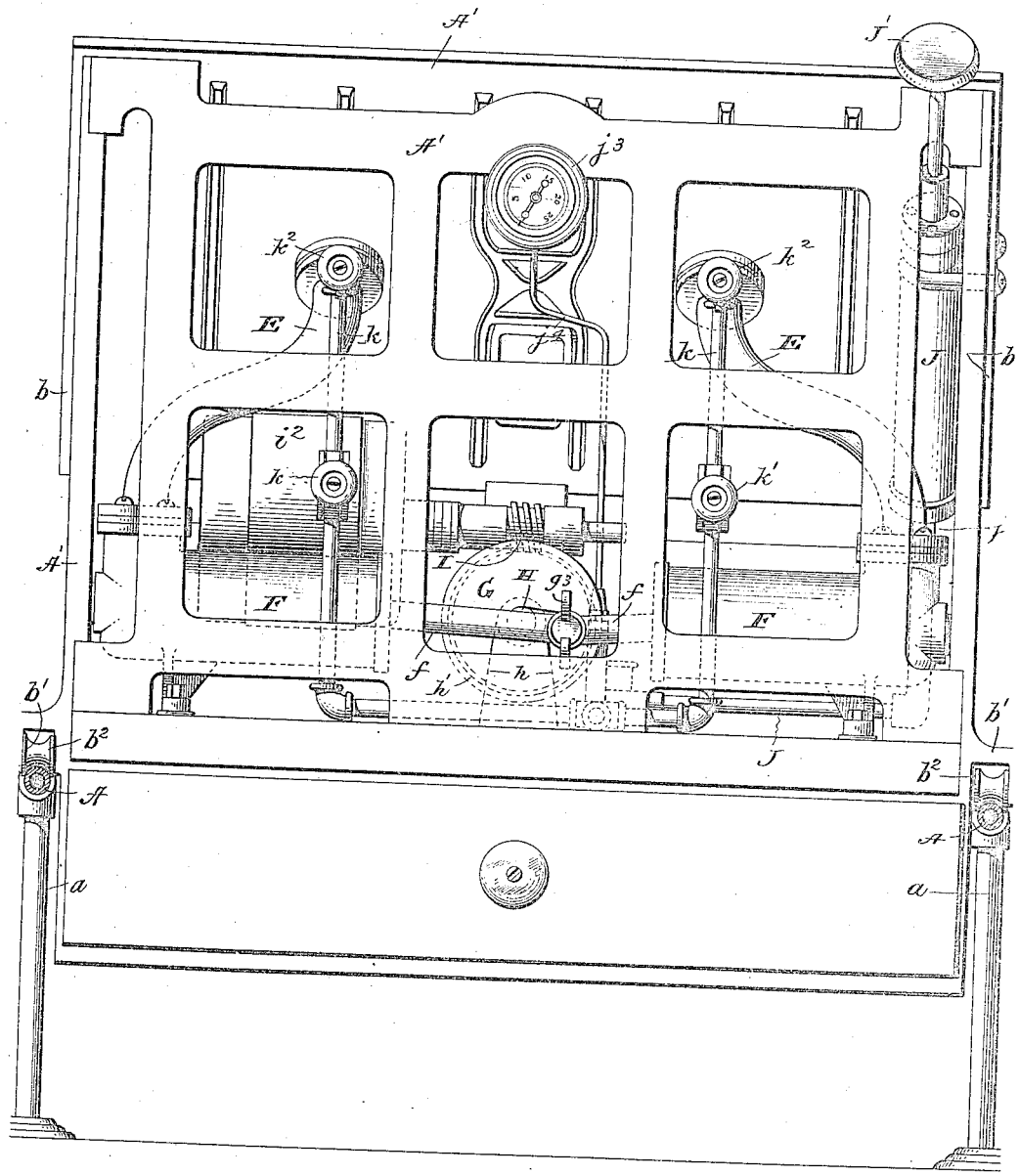
Fig. 3 is a back view.
Figure 4:
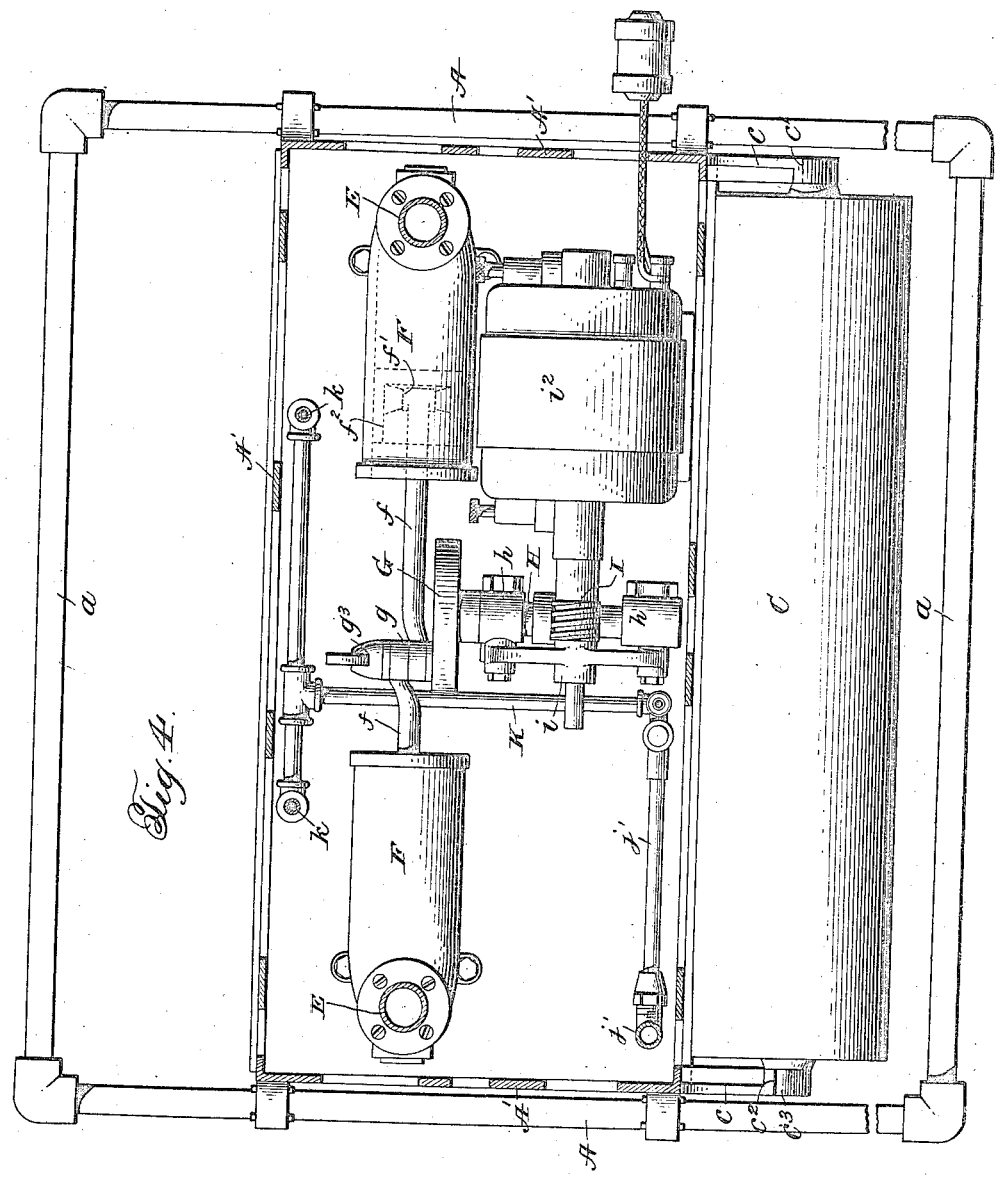
Fig. 4 is a horizontal sectional view looking down upon the operating mechanism confined below the top portion of the frame.
Figure 5:
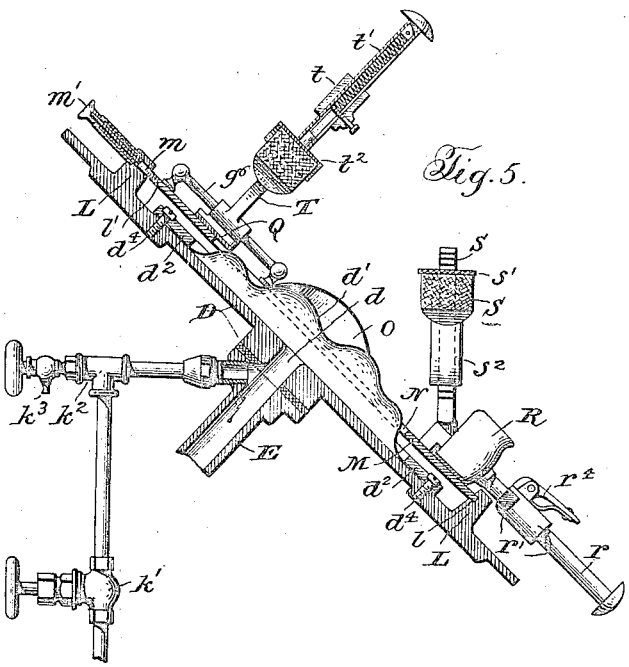
Fig. 5 is a transverse sectional view through the upper portion of the machine showing the foot holding means.
Figure 6:
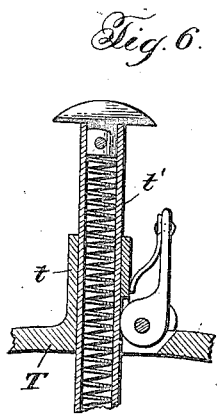
Fig. 6 is a detail sectional view showing the style of clamp used in the adjustment of the foot holding parts.
Figure 7:
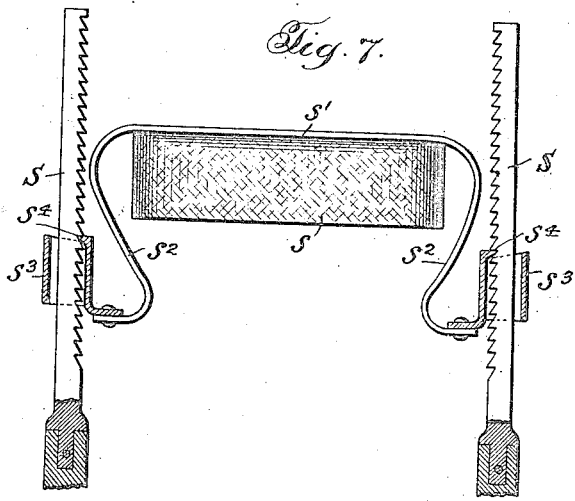
Fig. 7 is a transverse sectional view through the instep engaging clamp and associated parts.

J is a pump, conveniently shown as manually operable, the same being rigidly suspended below the top plate of the casing so as to have its handle $J'$ project rearwardly outside of the casing and thus be easily accessible for operation, the discharge end of the pump being connected in any suitable manner through a pipe $j'$ and flexible hose connection $j^x$ (Fig. 2) to the storage tank C and the air in the tank compressed to the desired degree by means of said pump, the degree of pressure being ascertainable through the medium of a pressure gage $j^3$ facing rearwardly of the machine and in communication with the tank through a constantly open pipe connection $j^4$.

K is a common pipe leading from the compressed air tank to feed to oppositely extending branches $k$ running to an opening into the pipes $k^4$ which connect the perforated top plates with the cylinders. The last defined leads or branches $k$ are provided each with a pair of valves $k'$, $k^2$, the lower valves $k'$ being adapted to disconnect one half of the machine if it is desired to only operate the other half thereof, and the upper valves $k^2$ being employed to cut off the air supply in the portion of the machine being operated when a sufficient amount has been permitted to enter beneath the flexible massaging implement and fill the pipe leading therefrom to the cylinder associated therewith.

From so much of the apparatus as has herein been set forth, it will be understood that the foot to be treated is placed over the flexible massaging implement and both valves opened so that the desired amount of air may enter below the rubber sheet, and fill the pipe leading to the cylinder associated therewith, the piston in said cylinder being assumed to be in its outermost position will expand the sheet to the maximum extent desired when the upper valve will be closed and the motor started. The operation of the motor will effect the rapid rotation of the crank plate and correspondingly reciprocate the piston rod and piston in the cylinder, which will alternately effect the expansion and contraction of the rubber sheet,—or bag so to speak,—effecting the desired manipulation of the foot structure.

The air between the piston and the sheet may be in itself styled an air piston adapted to recede from or thrown outwardly against the rubber sheet, in keeping with the movement of the piston in its cylinder, the recession being effected by the suction created by the piston and the expansion by the opposite or compression stroke of the piston.

Suitable means should be provided for holding the foot in place while being subjected to the pneumatic massaging action above mentioned, or to hold both feet in such position, if both feet are being simultaneously treated, and to that end I provide a pair of foot supports, of which, they being identical, a specific description of one will suffice for both. Projecting forwardly from the inclined top plate of the casing and parallel to the upper and lower edges thereof I form integrally with the casing, a pair of ledges L, the inner faces thereof being grooved to form slideways as at $l$, opening at the end of the casing. M is a plate adapted to be inserted by a sliding movement in said ledges from the end of the machine referred to into a position properly disposed over the pneumatic massaging implement, the plate being held in place by means of a spring pressed pin $m$ passing through one of the ledges L to removably engage a notch $l'$ in the adjacent edge of the plate, the pin being provided with a finger piece $m'$ of service when the pin is to be withdrawn and the plate removed for purposes of repair of the parts, or for the substitution of a plate bearing holding means of different size or shape as compared to those now to be defined.

The plate is formed with an enlarged central opening N conforming generally to the shape of the bottom of the foot, said opening having a detachable forwardly projecting curved flange O at the edge of the opening corresponding to the inner or high portion of the foot arch; and in the plane of the opposite edge of the plate, shaped to conform to the configuration of the plate is a detachable section or filler P, useful in reducing the width of the opening, as occasion requires, the filler being provided with a leg $o$ removably engaging a bracket $o'$ on the bottom of the plate.

To reduce the length of the opening I provide a transversely disposed strip Q, slidable upon parallel rods $q^6$ on the face of the plate at the upper or toe portion thereof, it being observed that the plates, fillers and strips are formed of rigid metal so as to confine the expansion of the massaging implement to the area of the actual opening in the plate circumscribed by these removable and adjustable fillers and strips.

R is a heel rest, shaped to conform to the bottom and rear of a heel, the same being adjustable longitudinally of the plate and upon the surface thereof through the medium of a hand operated stem $r$ passing through a bracket $r'$ projecting from the lower edge of the plate, said stem being hollow and containing a spring bearing against the lower end of the stem and at its upper end abutting against a screw $r^2$ in the bracket and entering a slot in the stem so that the spring normally tends to throw the heel rest outwardly or may be forcibly compressed to move the heel rest inwardly to the desired position, where the latter may be held fixed in adjusted position by a spring actuated cam clamp $r^4$ on the bracket and binding against the stem.

Projecting vertically from the opposite inner ends of the bracket which I have just been describing are a pair of inwardly toothed bars S designed to support an instep clamp, the latter comprising a heavy felt or similar pad $s$, backed by a leather piece $s'$, and connected by flexible leather terminals $s^2$ adapted to pass around the sides of the foot, to lock sleeves $s^3$, the same being formed to slide over the toothed bars and the connection of the terminal or strap portions of the pad therewith being at the inner bottom sides of the sleeves, the pressure of the pad on the instep will positively tilt the sleeves to cause lips or flanges $s^4$ at the inner upper ends of the sleeves to engage with the teeth of the bars and hold the clamp in adjusted position until the sleeves may be manually righted from their canted positions to permit them to be freely moved upwardly on the bars and correspondingly release the clamp.

I also provide a clamp for the toe portion of the foot and inasmuch as this clamp must be moved to and fro to correspond to the length of the foot, coupled with the fact that the adjustment of the strip for regulating the opening in the plate is in consonance with the adjustment of the toe clamp, these parts are mounted to move together, to which end the bearings for the strip carry an outwardly projected bracket T, having a bearing $t$ in which the stem $t'$ of a longitudinal curved clamping plate $t^2$ may reciprocate. said clamping plate carrying a heavy felt pad similar to the pad of the instep clamp, and this clamp being adjustable in its support and bearing in the same way that the heel clamp is adjustable.

From the foregoing it will be apparent that the toe clamp being thrust upwardly by its spring to its highest position, and the instep clamp being released from one of its toothed bars, the heel rest may be forced against the pressure of its spring to its desired adjusted position where it will be held by its cam clamp and the foot of the patient placed upon the plate over the opening thereof and in comfortable engagement with the heel rest. Thereupon the toe clamp may be adjusted toward the heel rest, correspondingly adjusting the cover strap associated therewith and the toe clamp forced downwardly against the tension of its spring into firm engagement with the toe portion of the foot, when the automatically acting cam clamp will fasten the toe clamp in position. The instep clamp may then be brought over the instep, and the previously disengaged sleeve slipped over its appropriate toothed bearing and the two sleeves moved downwardly over the inclined surface of the teeth until proper binding action is obtained when, upon letting go of the manual holding on the sleeves, they will be canted to engage the under horizontal surface of the teeth and the instep clamp locked in position. The massaging operation may thereupon be carried into effect as outlined in the fore part of this specification.

After the use of the machine the air may be exhausted through the suitably controlled valved exhaust ducts $k^3$.

While I have illustrated what I have believed the preferred embodiment of my invention, it will be understood by persons skilled in the art that the invention is capable of embodiment in many other forms and devices without departing from the spirit thereof and as may be in keeping with the hereto appended claims.

Having thus described the invention, what is claimed is:

1. In a machine of the character described, an instep clamp comprising a foot rest, posts projecting upwardly therefrom, one of said posts having a toothed face, and an instep engaging portion fastened at one end to one of the posts, and a sleeve at the opposite end thereof slidable over the other post, said sleeve being so attached as to be canted when the clamp engages the instep, and a part on the sleeve adapted to engage the toothed post when the sleeve is canted, substantially as described.

2. In a machine of the character described, an instep clamp comprising a foot rest, posts projecting upwardly therefrom, one of said posts having a toothed face, and an instep engaging portion fastened at one end to one of the posts, and a sleeve at the opposite end thereof slidable over the other post, said sleeve being so attached as to be canted when the clamp engages the instep, and a part on the sleeve adapted to engage the toothed post when the sleeve is canted, the connection between the sleeve and the instep engaging part being flexible, substantially as described.

3. In a machine of the character described, an instep clamp comprising a foot rest, posts projecting upwardly therefrom, one of said posts having a toothed face, an instep engaging portion fastened at one end to one of the posts and a sleeve at the opposite end thereof slidable over the other post, said sleeve being so attached as to be canted when the clamp engages the instep, and a part on the sleeve adapted to engage the toothed post when the sleeve is canted, and the connections at the opposite ends of the instep engaging part being flexible, substantially as described.

4. In a machine of the character described, an expansible foot massaging element, a foot rest having an opening over said element, and means for varying the size of the opening comprising a removable insert in said opening of the foot rest.

5. In a machine of the character described, an expansible foot massaging element, a foot rest having an opening over said element, and means for varying the size of the opening comprising a removable insert in said opening of the foot rest, said insert having an engaging part, and the foot rest having a complementary part enabling a securing interfit thereof.

6. In a machine of the character described, an expansible foot massaging element, a foot rest having an opening over said element, and means for varying the size of the opening comprising a removable insert in said opening of the foot rest, said insert having a lateral projection and the foot rest a receiving member therefor, substantially as described.

7. In a machine of the character described, an expansible foot massaging element, a foot rest having an opening over said element, and means for varying the size of the opening comprising a strip movable over the foot rest and adapted to underlie the foot to be treated, substantially as described.

8. In a machine of the character described, an expansible foot massaging element, a foot rest having an opening over said element, and means for varying the size of the opening comprising a strip movable over the foot rest and adapted to underlie the foot to be treated, in combination with guides on which the strip is slidable.

9. In a machine of the character described, an expansible foot massaging element, a foot rest having an opening over said element, and means for varying the size of the opening comprising a strip movable over the foot rest and adapted to underlie the foot to be treated, in combination with a foot clamp movable in consonance with the movement of said strip.

10. In a machine of the character described, an expansible foot massaging element, a foot rest having an opening over said element, and means for varying the size of the opening comprising a strip movable over the foot rest and adapted to underlie the foot to be treated, in combination with guides on which the strip is slidable, and foot clamps carried by the said strips, said foot clamps projecting above said guides.

11. In a machine of the character described, an expansible foot massaging element, a foot rest having an opening over said element, and means for varying the size of the opening with reference to both its longitudinal and transverse areas, substantially as described.

12. In a machine of the character described, an expansible foot massaging element, a foot rest having an opening over said element, and separate, independently operable means for varying the size of the opening with reference to both its longitudinal and transverse areas, substantially as described.

13. In a machine of the character described, an expansible foot massaging element, a foot rest having an opening over said element, means at the outer side of the opening for restricting the area thereof, and a forwardly projecting extension at the inner edge of the opening to prevent lateral deflection of the massaging element, substantially as described.

14. In a machine of the character described, an expansible foot massaging element, a foot rest having an opening over said element, and means located in approximately the plane of the plate at the outer side of the opening for restricting the area thereof, and a forwardly projecting extension at the inner edge of the opening to prevent lateral deflection of the massaging element, substantially as described.

15. In a machine of the character described, a pneumatic expansible foot massaging element, means for holding a foot in operative association therewith, and means for effecting successive uniform pulsations of said element, substantially as described.

16. In a machine of the character described, a pneumatic expansible foot massaging element, means for holding a foot in operative association therewith, and means for effecting rapidly successive uniform pulsations of said element, substantially as described.

17. In a machine of the character described, a pneumatic expansible foot massaging element, means for holding a foot in operative association therewith, and means for effecting rapidly successive uniform pulsations of said element, said means including a column of air, and means for reciprocating the same, substantially as described.

18. In a machine of the character described, a pneumatic expansible foot massaging element, means for holding a foot in operative association therewith, and means for effecting rapid successive uniform pulsations of said element, said means including a column of air, and adjustable means for varyingly reciprocating the same, substantially as described.

19. In a machine of the character described, a pneumatic expansible foot massaging element, means for holding a foot in operative association therewith, and means for effecting rapidly successive uniform pulsations of said element, said means includng a column of air, and means for reciprocating the same consisting of a coacting piston and cylinder and operating means therefor, substantially as described.

20. In a machine of the character described, a pneumatic expansible foot massaging element, means for holding a foot in operative association therewith, means for effecting rapidly successive uniform pulsations of said element, said means including a column of air, and means for reciprocating the same consisting of a coacting piston and cylinder, and operating means therefor adjustable to regulate the extent of relative movement thereof, substantially as described.

21. In a machine of the character described, a pneumatic expansible foot massaging element, means for holding a foot in operative association therewith, and means for effecting rapidly successive uniform pulsations of said element, said means including a column of air, and means for reciprocating the same, in combination with a valved air supply leading to the massaging element adapted to furnish and control the volume of the column of air.

22. In a machine of the character described, a pneumatic expansible foot massaging element, means for holding a foot in operative association therewith, and means for effecting rapidly successive uniform pulsations of said element, said means including a column of compressed air and means for reciprocating the same, in combination with a valved air supply leading to the massaging element adapted to furnish and control the volume of the column of air, and a pump for initially storing said air, substantially as described.

23. In a machine of the character described, a pair of pneumatic expansible foot massaging elements, means for holding the feet in operative association therewith, and automatically acting means for alternately effecting successive pulsations of said elements, substantially as described.

24. In a machine of the character described, a pair of pneumatic expansible foot massaging elements, means for holding the feet in operative association therewith, and automatically acting means for alternately effecting successive pulsations of said elements, said means including columns of air, and means for reciprocating the same, substantially as described.

25. In a machine of the character described, a pair of pneumatic expansible foot massaging elements, means for holding the feet in operative association therewith, and automatically acting means for alternately effecting successive pulsations of said elements, said means including columns of air, and adjustable means for varyingly reciprocating the same, substantially as described.

26. In a machine of the character described, a pair of pneumatic expansible foot massaging elements, means for holding the feet in operative association therewith, and automatically acting means for alternately effecting successive pulsations of said elements, said means including columns of air, and adjustable means for varyingly reciprocating the same consisting of a pair of coacting pistons and cylinders and operating means therefor, substantially as described.

27. In a machine of the character described, a pair of pneumatic expansible foot massaging elements, means for holding the feet in operative association therewith, and automatically acting means for alternately effecting successive pulsations of said elements, said means including columns of air, and adjustable means for varyingly reciprocating the same consisting of a pair of coacting pistons and cylinders, and a common operating means therefor, substantially as described.

28. In a machine of the character described, a pair of pneumatic expansible foot massaging elements, means for holding the feet in operative association therewith, and automatically acting means for alternately effecting successive pulsations of said elements, said means including columns of air, adjustable means for varyingly reciprocating the same consisting of coacting pistons and cylinders, and operating means therefor adjustable to regulate the extent of relative movement of each piston and its cylinder, substantially as described.

29. In a machine of the character described, a pair of pneumatic expansible foot massaging elements, means for holding the feet in operative association therewith, and automatically acting means for alternately effecting successive pulsations of said elements, said means including columns of air, adjustable means for varyingly reciprocating the same consisting of coacting pistons and cylinders, and a common operating means therefor adjustable to regulate the extent of relative movement of each piston and its cylinder, substantially as described.

30. In a machine of the character described, a pair of pneumatic expansible foot massaging elements, means for holding the feet in operative association therewith, and automatically acting means for alternately effecting successive pulsations of said elements, said means including columns of air, and means for reciprocating the same, in combination with a valved air supply leading to the respective massaging elements adapted to furnish and control the volume of the columns of air, substantially as described.

31. In a machine of the character described, a pneumatic expansible massage element, means for holding the member to be treated in operative association therewith, and means for effecting successive pulsations of said element, substantially as described.

32. In a machine of the character described, a pneumatic massage element, means for holding the member to be treated in operative association therewith, and means for effecting successive pulsations of said element, substantially as described.

In testimony whereof I hereunto affix my signature, in the presence of two witnesses.

WILLIAM C. J. GUILFORD.

Witnesses:
HENRY M. KINGMAN,
L. E. RICHARDSON.

Copies of this patent may be obtained for five cents each, by addressing the "Commissioner of Patents, Washington, D. C."